United States Patent [19]
Ensch et al.

[11] Patent Number: 5,634,550
[45] Date of Patent: Jun. 3, 1997

[54] DIRECTION CHANGING MECHANISM FOR TRANSFERRING ARTICLES BETWEEN TRANSVERSE CONVEYORS

[75] Inventors: Peter J. Ensch, Wauwatosa; Paul J. Marks, Milwaukee; Thomas Montaine, Thiensville; Timothy J. Schladweiler, West Bend, all of Wis.

[73] Assignee: Rexnord Corporation, Milwaukee, Wis.

[21] Appl. No.: 374,849

[22] Filed: Jan. 19, 1995

Related U.S. Application Data

[63] Continuation-in-part of Ser. No. 30,621, Mar. 12, 1993, Pat. No. 5,335,768.

[51] Int. Cl.$^6$ ............................................... B65G 47/26
[52] U.S. Cl. ..................... 198/457; 198/599; 198/803.01; 198/853
[58] Field of Search ........................ 198/457, 599, 198/600, 606, 637, 803.01, 850, 851, 853

[56] References Cited

U.S. PATENT DOCUMENTS

| | | | |
|---|---|---|---|
| 811,391 | 1/1906 | Gates . | |
| 1,046,124 | 12/1912 | Wagner . | |
| 1,966,659 | 7/1934 | Wynne et al. | 198/195 |
| 2,402,376 | 6/1946 | Dalrymple | 198/851 |
| 2,631,465 | 3/1953 | Cordis | 198/851 |
| 2,951,578 | 9/1960 | Hibbard | 198/851 |
| 3,643,781 | 2/1972 | Risley et al. | 198/600 |
| 3,871,510 | 3/1975 | Homeier | 198/803.01 |
| 3,910,406 | 10/1975 | Pulver et al. | 198/803.01 |
| 4,006,817 | 2/1977 | Paul | 198/853 |
| 4,557,374 | 12/1985 | Bode | 198/852 |
| 4,709,807 | 12/1987 | Poerink | 198/853 |
| 4,765,455 | 8/1988 | Matsuno et al. | 198/851 |
| 4,832,187 | 5/1989 | Lapeyre | 198/853 |
| 4,858,753 | 8/1989 | Hodlewsky | 198/853 |
| 4,893,710 | 1/1990 | Bailey | 198/853 |
| 4,953,693 | 9/1990 | Draebel | 198/853 |
| 4,993,544 | 2/1991 | Bailey | 198/834 |
| 5,000,312 | 3/1991 | Damkjaer | 198/853 |
| 5,020,659 | 6/1991 | Hodlewsky | 198/853 |
| 5,024,321 | 6/1991 | Lapeyre | 198/853 |
| 5,031,757 | 7/1991 | Draebel | 198/852 |
| 5,083,660 | 1/1992 | Horton | 198/853 |
| 5,123,524 | 6/1992 | Lapeyre | 198/853 |
| 5,167,319 | 12/1992 | McMackin | 198/599 |
| 5,217,110 | 6/1993 | Spangler et al. | 198/853 |
| 5,247,789 | 9/1993 | Abbestam et al. | 198/851 |
| 5,335,768 | 8/1994 | Schladweiler | 198/853 |

FOREIGN PATENT DOCUMENTS 2089475  6/1982  United Kingdom .

OTHER PUBLICATIONS

Cambridge Wire Cloth Company Brochure "B 3000 Modular Plastic Belt", 1989.

*Primary Examiner*—Joseph E. Valenza

[57] ABSTRACT

The invention provides a conveying apparatus including an upstream conveyor, a downstream conveyor oriented perpendicularly to the upstream conveyor to form a butt turn, and a mechanism for transferring conveyed articles from the upstream conveyor to the downstream conveyor. The transfer mechanism includes guide rails that provide a corner to change the direction of travel of the conveyed articles and a transfer assist conveyor for supporting the articles as they travel between the upstream and downstream conveyors. The transfer assist conveyor runs alongside the upstream conveyor and has a cantilevered section that extends over the sprocket location of the downstream conveyor to perform the function of a prior art static transfer plate.

22 Claims, 5 Drawing Sheets

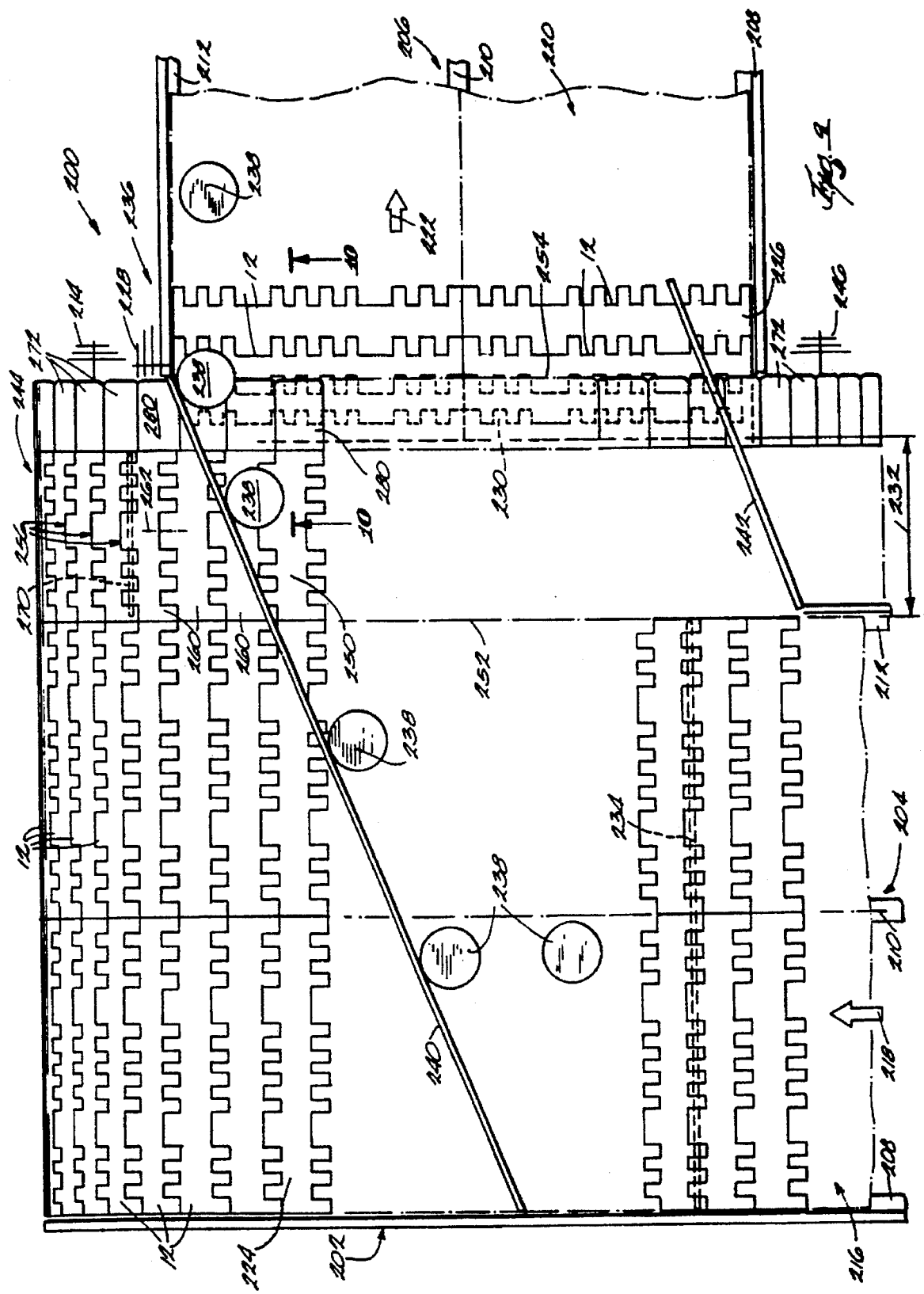

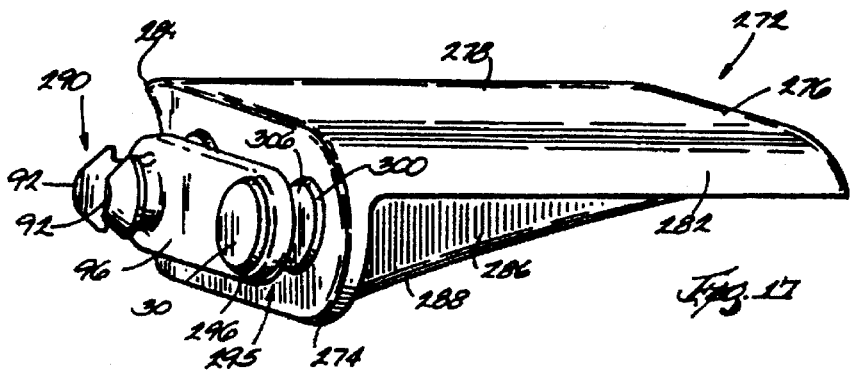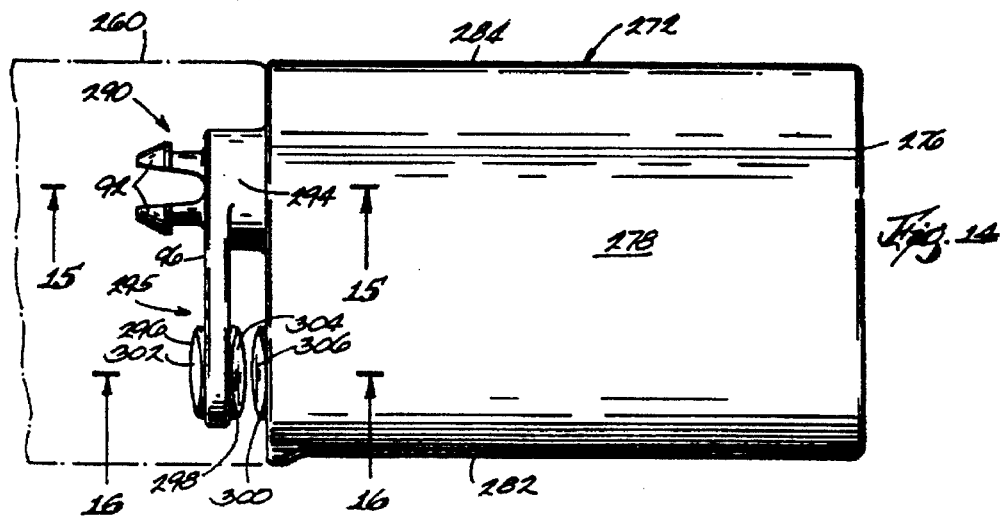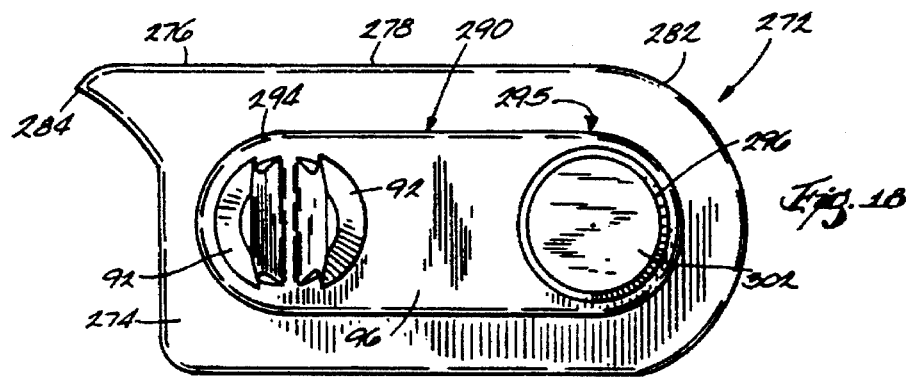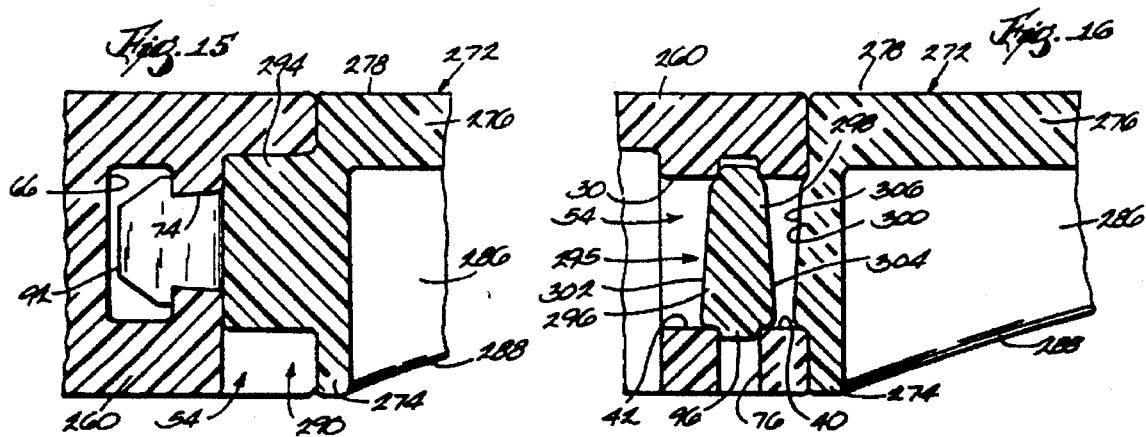

DIRECTION CHANGING MECHANISM FOR TRANSFERRING ARTICLES BETWEEN TRANSVERSE CONVEYORS

CROSS-REFERENCE TO RELATED APPLICATION

This application is a continuation-in-part of U.S. patent application Ser. No. 08/030,621, filed Mar. 12, 1993 U.S. Pat. No. 5,335,768, now allowed, and the specification of which is herein incorporated by reference.

BACKGROUND OF THE INVENTION

1. Field of the Invention

The invention relates generally to article conveying apparatus, and more particularly to mechanisms for transferring articles between transversely oriented conveyor belts or chains.

2. Reference to Prior Art

Conveying equipment is used in various manufacturing, treatment and other processes for transporting articles. Known conveying equipment includes conveyor chains that are constructed of chain links or modules interconnected by chain pins and that are supported on conveyor frames which define a path of travel for the conveyed articles.

When it is desirable to convey articles along a nonlinear path, it is known to employ side-flexing conveyor chains. Examples of chain links used in side-flexing conveyor chains are provided in U.S. Pat. Nos. 4,893,709 and 4,436,200. Where wider conveying surfaces or higher load carrying capacities are desired, straight-running conveyor chains are often preferred over side-flexing conveyor chains. Examples of chain links used in straight-running conveyor chains are provided in U.S. Pat. Nos. 5,215,185, 5,125,504, 4,858,753, Des. 270,201 and Des. 270,202.

To form a nonlinear conveyor path with straight-running conveyor chains, those chains are arranged transversely to one another and an article transfer mechanism is provided at the intersection to transfer articles between the conveyor chains. In applications where the conveyed articles are not susceptible to tipping and are large enough so as not to fall through the gap between transversely oriented conveyor chains, the transfer mechanism can include only guide rails to redirect the path of the articles. For example, short articles with large "footprints" are sometimes conveyed between perpendicularly oriented small-pitch conveyor chains (i.e., having pitches of less than about one inch) without the need for structure to prevent the articles from falling through the gap between the conveyor chains. In other applications, mechanisms such as static transfer plates and transfer assist conveyor chains are used in conjunction with the guide rails to transfer articles between the conveyor chains.

An example of a conveying apparatus employing guide rails, a static transfer plate, and a narrow-width transfer assist conveyor chain at a 90 degree turn or "butt corner" between transversely oriented upstream and downstream conveyors is illustrated in U.S. Pat. No. 5,167,319. In that patent, the transfer plate extends along side the upstream conveyor in a gap between the upstream and downstream conveyors. The transfer assist chain is arranged along side the downstream conveyor at the butt corner to fill the transition area defined by the guide rails. In other arrangements the transfer assist chain could also be arranged along side OF the upstream conveyor.

SUMMARY OF THE INVENTION

The invention provides a conveyor apparatus including an improved mechanism for transferring conveyed articles between transversely oriented conveyors. The improved transfer mechanism combines the advantages of a static transfer plate and a prior art transfer assist conveyor in a single conveyor. Unlike static transfer plates on which conveyed articles can hang up if not pushed along by succeeding articles, the improved transfer mechanism operates dynamically to provide a self-clearing capability. Thus, the last article(s) in a particular conveying run to be transferred between the transversely oriented conveyor chains will not need to be cleared manually, as is sometimes the case with static transfer plates. Additionally, the improved transfer mechanism is readily useable with conveyor chains having large pitches (i.e., pitches of about one inch or more) making the use of more expensive small-pitch conveyor chains unnecessary in some applications.

More particularly, the invention provides a conveying apparatus including transversely oriented upstream and downstream conveyors which in one embodiment are arranged at right angles to form a butt turn. The conveying apparatus also includes an article transfer mechanism for directing articles from the upstream conveyor to the downstream conveyor. The transfer mechanism includes guide rails to change the direction of the conveyed articles, and a transfer assist conveyor positioned between the upstream and downstream conveyors to transfer the conveyed articles therebetween.

The transfer assist conveyor is preferably parallel to and runs at the same speed as one of the upstream and downstream conveyors with one side of the transfer assist conveyor closely adjacent or abutting that one conveyor. The opposite side of the transfer assist conveyor is cantilevered over the sprocket location of the other of the upstream and downstream conveyors and acts as a transfer plate to substantially fill the gap therebetween. In one embodiment, the transfer assist conveyor is a chain that includes a plurality of pin interconnected chain links. Each chain link includes a molded plastic link module that intermeshes with other link modules, and an attachment that is mountable in cantilevered relation on the side of the link module.

In one embodiment, the invention also provides a conveyor apparatus including a first conveyor having an article supporting surface and a transition section that is located at a sprocket location and that deviates from the plane of the article supporting surface. The conveyor apparatus also includes a second conveyor oriented transversely to the first conveyor. The second conveyor includes a plurality of chain links having link module portions that are interconnected by chain pins. The link module portions include upper surfaces which together form an article supporting surface on the second conveyor that is coplanar to the article supporting surface of the first conveyor. The chain links also include cantilevered portions that extend laterally from the link module portions to provide an extension of the article supporting surface of the second conveyor. The extension overhangs the transition section of the first conveyor to act as a moving transfer plate for smoothly transferring conveyed articles between the first and second conveyors.

The invention further provides a conveyor apparatus including first and second transversely oriented conveyors that are both supported on a frame and that each includes an article supporting surface. The conveyor apparatus also includes means for transferring conveyed articles from the first conveyor to the second conveyor. In one embodiment that transferring means includes a transfer assist conveyor supported on the frame in side-by-side parallel relation with the first conveyor and in transverse relation to the second conveyor. The transfer assist conveyor includes an article supporting surface that is coplanar with the article supporting surfaces of the first and second conveyors, and the transfer assist conveyor is preferably formed as a chain including a plurality of interconnected chain links. Each of the chain links includes a link module portion and a cantilevered portion extending laterally from the link module portion. The cantilevered portions of the chain links form an extension of the article supporting surface of the transfer assist conveyor which overhangs the second conveyor.

Other features and advantages of the invention will become apparent to those skilled in the art upon review of the following detailed description, claims and drawings.

BRIEF DESCRIPTION OF THE DRAWINGS

FIG. 9 is a partially schematic top plan view of a portion of a conveyor apparatus including an article transfer mechanism that embodies the invention.

FIG. 14 is a further enlarged and partially schematic view of a portion of a chain link illustrated in FIG. 13.

FIG. 15 is an enlarged view taken along line 15—15 in FIG. 14.

FIG. 16 is an enlarged view taken along line 16—16 in FIG. 14.

FIG. 17 is a perspective view of the cantilevered attachment illustrated in FIG. 14.

FIG. 18 is an enlarged end view of the cantilevered attachment illustrated in FIG. 17.

Figure 1:
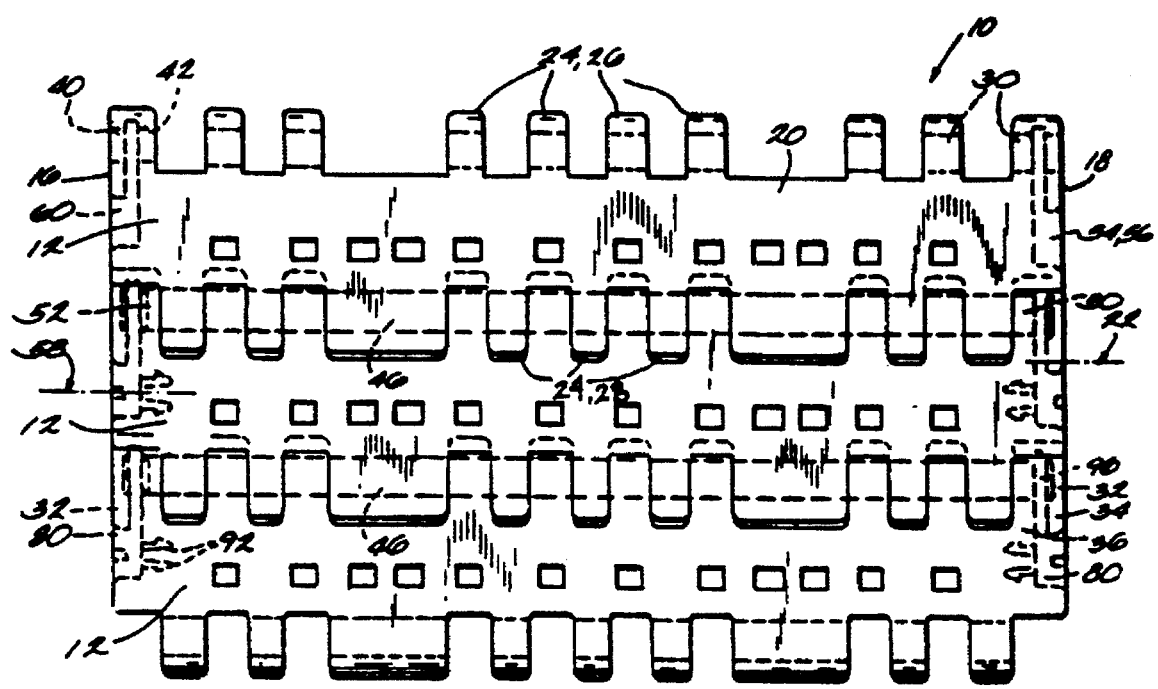
FIG. 1 is a top plan view of a portion of a conveyor chain.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Figure 2:
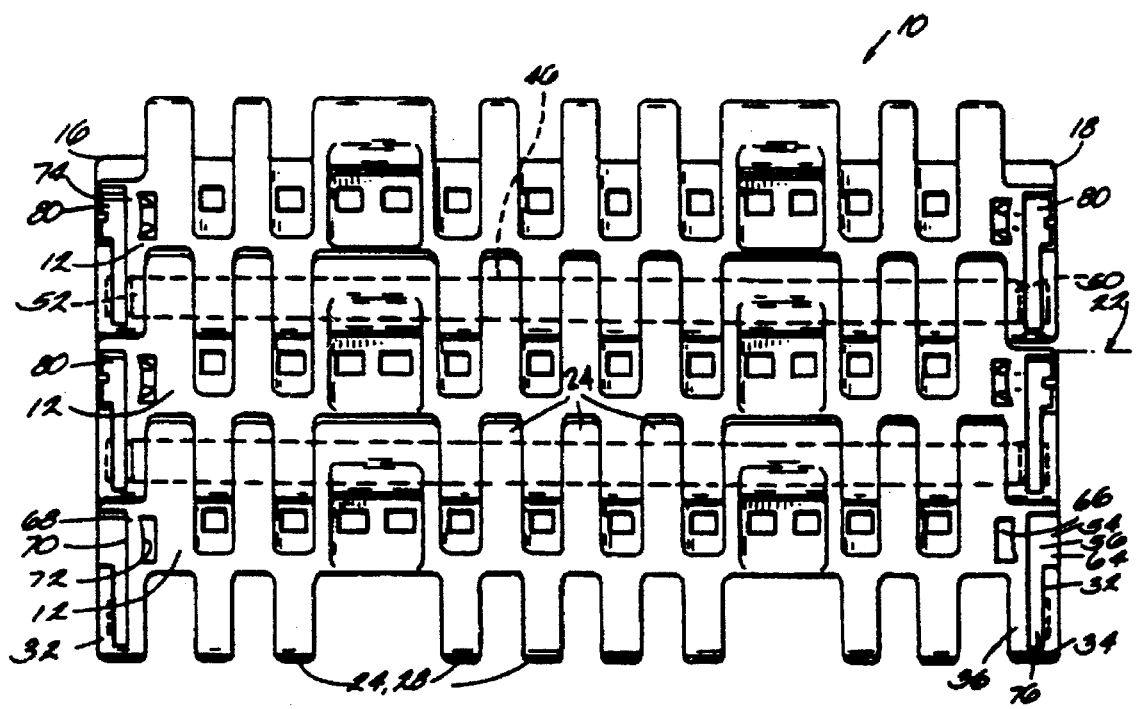
FIG. 2 is a bottom plan view of the conveyor chain illustrated in FIG. 1.

Illustrated in FIGS. 1–8 is a conveyor chain assembly 10 including a multiplicity of rows of intermeshed chain modules 12 of which only three are depicted in FIGS. 1 and 2. While in the illustrated construction the rows of modules are made up of only a single module 12, the rows of modules could include more than one module 12 to form a wider conveyor chain, if desired. Each module 12 may be comprised of molded plastic and includes opposite ends 16 and 18, an intermediate section 20 and a lateral axis 22. A plurality of link ends 24 project forwardly and rearwardly from the intermediate section 20 with respect to the direction of movement of the conveyor chain 10. A first set 26 of link ends 24 projects forwardly of the intermediate section 20 and a second set 28 of link ends 24 projects rearwardly of the intermediate section 20. The intermediate section 20 thus integrally joins the first set 26 and the second set 28 of link ends 24. The link ends 24 include therethrough coaxially aligned openings or bores 30.

Figure 3:
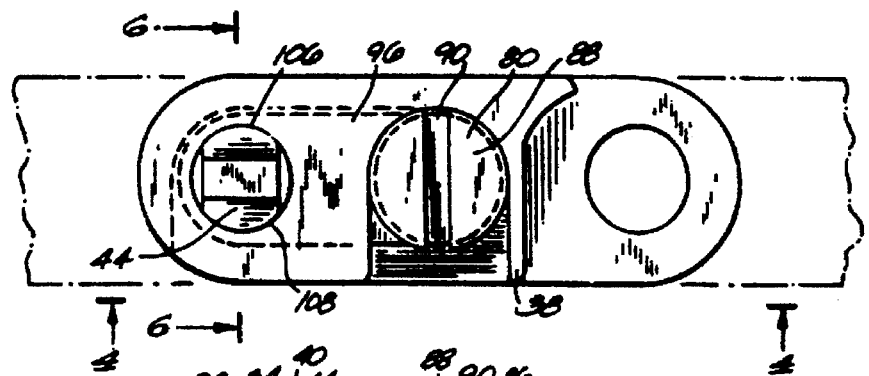
FIG. 3 is an enlarged end view of a portion of the conveyor chain illustrated in FIG. 1 and including an end of a chain module with an arm of a plug in a chain pin blocking position.
Figure 7:
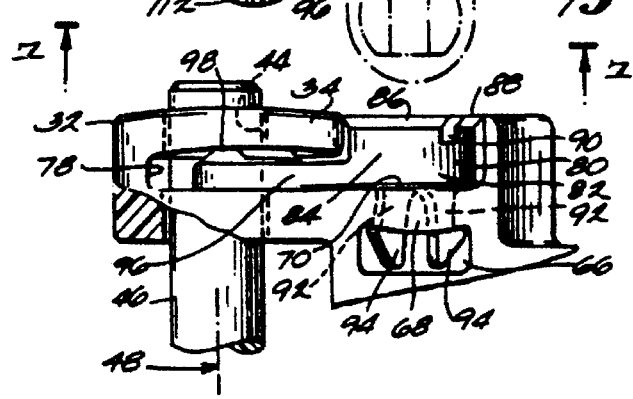
FIG. 7 is a view taken along line 7—7 in FIG. 5 and with portions broken away for purposes of illustration.

Either the first set 26 or the second set 28 of link ends 24 includes a special type of link end or terminating link end 32 which forms each end 16 and 18 of the module 12. The terminating link end 32 includes an outer portion 34, an inner portion 36 and an end wall 38 (FIGS. 3 and 5). The coaxially aligned opening 30 of the terminating link end 32 has an outer part 40 and an inner part 42. The outer part is defined by an annular wall 44 (FIGS. 4 and 7).

The link ends 24 of each module 12 intermesh with the link ends 24 of a module 12 in an adjacent row to form the conveyor chain. The modules 12 are interconnected in this intermeshed position by a pivot, hinge or chain pin 46 running through the coaxially aligned openings 30 of the intermeshed link ends 24 of adjacent modules 12. The chain pin 46 has an axis 48 (FIG. 4) and two ends 50, 52.

Continuing to refer to FIGS. 1 and 2, the module 12 further includes a socket 54 on each end 16 and 18 of the module 12. More specifically, the socket 54 is defined by the intermediate section 20 and the terminating link end 32. The socket 54 includes a shaft cavity 56 that is parallel to the direction of the coaxially aligned openings 30 and parallel to the axis 22 of the module 12. The shaft cavity 56 has a longitudinal axis 58 and is spaced from the coaxially aligned openings 30. The shaft cavity 56 includes a first inlet 60, a second inlet 62 (FIG. 4), a head portion 64, and a leg portion 66. A wall 68 separates the head portion 64 from the leg portion 66. The wall 68 has an outer and an inner surface 70 and 72 respectively and has an aperture 74 therethrough. The aperture 74 allows communication between the head portion 64 and the leg portions 66.

Figure 4:
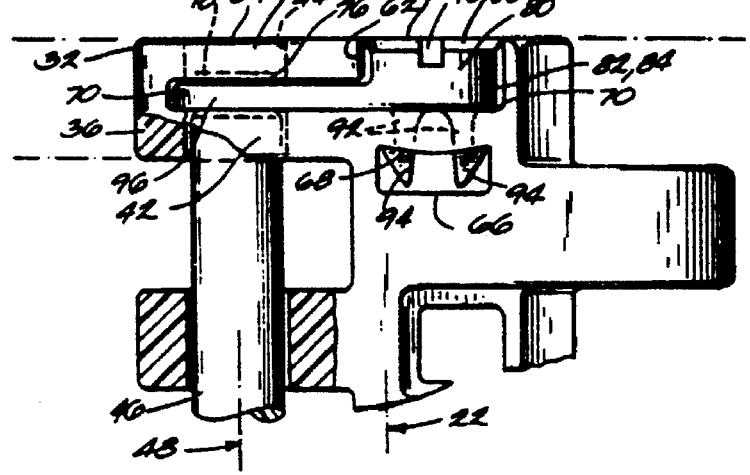
FIG. 4 is a view taken along line 4—4 in FIG. 3 and with portions broken away for purposes of illustration.
Figure 5:
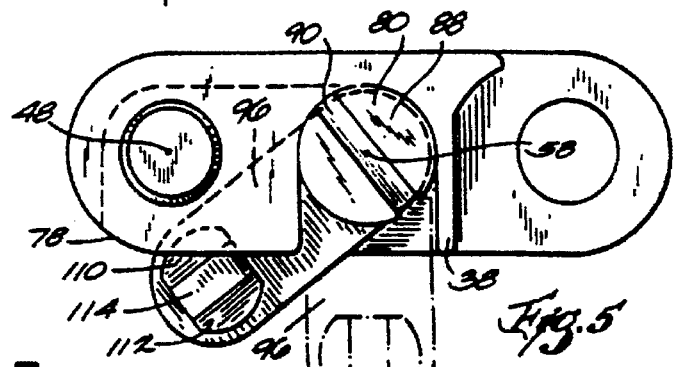
FIG. 5 is a view similar to FIG. 3 showing the arm of the plug in a first position.

The socket 54 further includes an arm cavity 76 having an inlet 78 (FIG. 4). The arm cavity 76 is transverse to the direction of the coaxially aligned openings 30 and transverse to the axis 22 of the module 12. The arm cavity 76 communicates with the shaft cavity 56. The arm cavity 76 separates the terminating link end 32 into the outer portion 34 with the outer part 40 of the opening 30 and the inner portion 36 with the inner part 42 of the opening 30. The arm cavity 76 communicates with both the outer and inner parts 40 and 42 of the opening 30.

Figure 8:
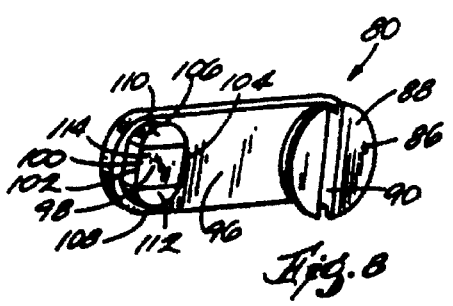
FIG. 8 is a perspective view of the plug.
Figure 13:
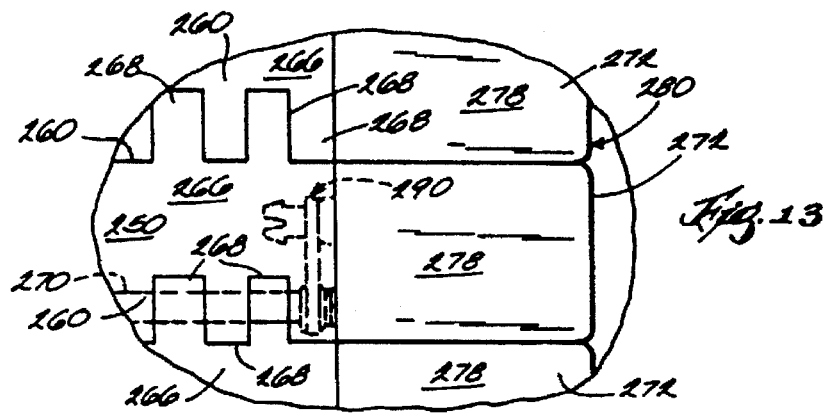
FIG. 13 is an enlarged view of a portion of the article transfer mechanism illustrated in FIG. 9.
Figure 10:
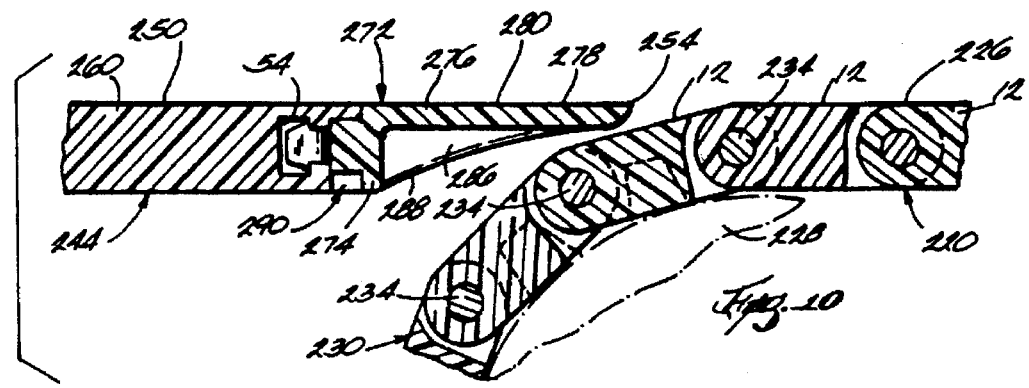
FIG. 10 is an enlarged view taken along line 10—10 in FIG. 9.

As shown in FIGS. 4 and 8, a chain pin retaining plug 80 is mountable in the module 12 for selectively restricting axial movement of the chain pin 46. The plug 80 includes a first portion or shaft 82 that is mountable in the shaft cavity 56 of the socket 54. The shaft 82 includes a shank 84 with a circular head 86 extending therefrom. The head 86 has a top surface 88 having therein a slot 90. The shaft 82 further includes means for securing the plug 80 in the socket 54 in the form of a pair of spaced legs 92 extending from the shank 84 in a direction opposite to that of the head 86. The legs are resilient such that the legs 92 can be deflected. Each leg 92 is tapered to facilitate insertion into the module 12 and each leg 92 terminates in a shoulder 94.

Continuing to refer to FIGS. 4 and 8, the plug 80 further includes a second portion or arm 96 that is selectively housed in the arm cavity 76 of the socket 54 and moveable between a first position wherein the arm 96 does not restrict axial movement of the chain pin 46 (FIG. 5) and a second position wherein the arm 96 does restrict axial movement of the chain pin 46 (FIG. 4). The arm 96 is integral with and extends outwardly from the shank 84. A projection 98 extends from the arm 96 in the same direction the head 86 extends from shank 84. As shown in FIG. 8, the projection 98 has a top surface 100, a pair of linear edges 102 and 104 and a pair of curved edges 106 and 108. The top surface 100 has a pair of chamfered portions 110 and 112 that are adjacent the curved edges 106 and 108 and a rectangular portion 114 between the chamfered portions 110 and 112. The projection 98 comprises a means for releasably positioning the arm 96 in the arm cavity 76.

The plug 80 is insertable into the module 12 as follows with reference to FIGS. 4, 5, and 7. With resilient legs 92 first, the shaft 82 is moved in the shaft cavity 56 via the first inlet 60 in a direction parallel to the axis 48 of the chain pin 46. As the plug 80 is moved further into the shaft cavity 56, the resilient legs 92 contact the outer surface 70 of the wall 68 and must deform inwardly to enable the shoulders 94 to slide through the aperture 74. After the shoulders 94 have passed through the aperture 74 and into the leg portion 66 of the shaft cavity 56, the legs 92 resume their original orientation and spring outwardly. In this position, the shoulders 94 contact the inner surface 72 of the wall 68 and the wall 68 does not allow the shoulders 92 to pass back through the aperture 74 thus retaining the plug 80 in the socket 54 and providing a snap-fit. This first snap-fit is intended to be permanent in that the plug 80 is not designed to be removed from the module 12 after placing it in this position. Further, in this position, the head 86 is flush with the end 16 of the module 12, and the shank 84 contacts the outer surface 70 of the wall 68 to prohibit the plug 80 from moving further into the interior of the module 12. As shown in phantom in FIG. 5, the arm 96 is in its first position filling the second inlet 62 of the shaft cavity 56 and not restricting the axial movement of the chain pin 46 such that the chain pin 46 can be inserted or removed from the aligned opening 30 in the link ends 24 without interference from the plug 80.

Figure 6:
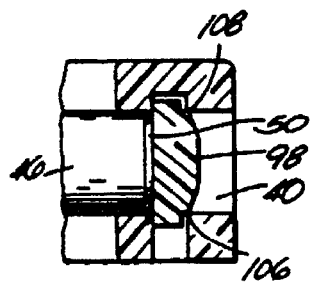
FIG. 6 is a partial side view taken along line 6—6 in FIG. 3.

When axial movement of the chain pin 46 needs to be restricted, such as when the conveyor is in operation, the arm 96 is moved into the second position as follows. Referring to FIG. 5, a tool such as a slotted screw driver is inserted into the slot 90 of the head 86 and rotated to enable the plug 80 to be pivoted about the axis 58 of the shaft cavity 56. The plug 80 is rotatable in only one direction because the end wall 38 of the terminating link end 32 prohibits rotation of the plug 80 in the other direction. While the plug 80 is being pivoted in the socket 54, the arm 96 enters the arm cavity 76 through the inlet 78 and the rectangular portion 114 of the top surface 100 of the projection 98 contacts the outer portion 34 of the terminating link end 32 causing the outer portion 34 to deform outwardly. This outward deformation allows the arm 96 to pass further into the arm cavity 76 until the projection 98 is clear of the outer portion 34 and the outer portion 34 returns to its normal orientation thus providing a second snap-fit as shown in FIG. 4. In this second position as shown in FIGS. 3, 4, and 6, the arm 96 is fully inserted into the arm cavity 76 with no part thereof projecting outwardly from the module 12. The arm 96 occludes communication between the outer and inner parts 40 and 42 of the opening 30. Further, the projection 98 extends into the outer part 40 of the opening 30 such that the curved edges 106 and 108 of the projection 98 contact the annular wall 44 and restrict pivotal movement of the arm 96 out of the arm cavity 76. In this second position, the arm 96 restricts axial movement of one end 50 of the chain pin 46. As shown in FIGS. 1 and 2, a second plug 80 in this position on the other end 18 of the module 12 would restrict axial movement of the other end 52 of the chain pin 46. If the rows of the conveyor chain assembly include more than one module 12, a plug 80 is inserted only into the socket of the modules 12 that form the ends of the rows. Thus, only two plugs 80 are utilized per row for either row configuration.

The second snap-fit is not intended to be permanent in that it is disengagable. If access or removal of the chain pin 46 is desired, the plug 80 is not removed from the module 12 but rather pivoted so that the arm 96 returns to the first position as previously described. The slotted screw driver is placed into the slot 90 of the head 86 and rotated to pivot the plug 80. As the plug 80 is pivoted, the chamfered portion 112 of the projection 98 causes the outer portion 34 to deform outwardly enabling the arm 96 to clear the outer portion 34 of the terminating link end 32 and return to the first position in which the plug 80 does not restrict the axial movement of the chain pin 46.

Once the plug 80 is inserted into and secured in the shaft cavity 56, it is not designed to be removable from the module 12. However, even though the plug 80 is not removable from the module 12, the chain pin 46 can still be removed or alternatively its movement restricted. The invention allows access to each chain pin 46 from either end of the row via the plug 80. When the plug 80 is restricting axial movement of the chain pin 46, the plug 80 is more securely positioned in the module 12 because of the two snap-fits which reduce the chances of the plug 80 popping out of the module 12. More specifically, the arm 96 provides additional load carrying capacity to the plug 80. In the ideal operation of the conveyor chain assembly 10, the arm 96 is not required to assume much load. However, when a product is channeled to one side of the conveyor chain assembly 10 or the conveyor chain assembly 10 is misaligned, an uneven load distribution in the link ends 24 results. This uneven load can be transmitted to the chain pin 46 causing an axial component of the uneven load to force the chain pin 46 out to one side of the module 12. Because the arm 96 is perpendicular to the axis 48 of the chain pin 46, these axial forces of the chain pin 46 cause the pin to engage the arm 96 in such a manner as to lock the plug 80, and more specifically the projection 98 of the arm 96, in place all the more as well as distribute the axial load of the chain pin 46 onto the terminating link ends 32. This transfer of forces causes the plug 80 to work under greater adversities while providing a greater level of reliability to the user.

Further, the plug 80 does not project outwardly of the module 12 because the arm 96 is in the arm cavity 76 and the head 86 is flush with the end 16 of the module 12. This positioning of the plug 80 does not alter the top of the conveyor chain assembly 10 and allows independent conveyor chains to run next to each other at equal or different speeds without the need for guides and without the fear of jamming. Running multiple conveyor chains very close together provides improved product handling and transfer of products on and off the conveyor chains.

Illustrated in FIGS. 9–18 is an article conveyor apparatus 200 in which the conveyor chain 10 is potentially useable and which embodies the invention. As shown in FIG. 9, the conveyor apparatus 200 includes a frame 202 which in the illustrated embodiment includes a pair of perpendicularly oriented frame section 204 and 206. Each of the frame sections 204 and 206 includes a set of frame rails 208, 210 and 212. Each of the frame sections 204 and 206 also includes a tail sprocket 214 (schematically shown only for frame section 204) and a head sprocket 228 (schematically shown only for frame section 206), one of which acts as a drive sprocket.

The conveyor apparatus 200 also includes an infeed or upstream conveyor 216 supported on frame section 204 for travel in the direction of arrow 218 (i.e., towards the top of the page in FIG. 9). In the embodiment illustrated in FIG. 9, the upstream conveyor 216 forms an endless loop trained around the tail sprocket 214 (and the head sprocket) of frame section 204. The upper run of the endless loop provides a substantially planar article supporting surface 224, and the underside of the upper run is supported by the frame rails 208, 210 and 212 of frame section 204.

The conveyor apparatus 200 also includes an outfeed or downstream conveyor 220 that is oriented transversely to the upstream conveyor 216 and that is supported for travel in the direction of arrow 222 (i.e., to the right in FIG. 9). The downstream conveyor 220 also forms an endless loop, the upper run of which has an article supporting surface 226 that is generally coplanar with the article supporting surface 224 of the upstream conveyor 216. The underside of that upper run is supported by the frame rails 208, 210 and 212 of frame section 206, and the downstream conveyor 220 is trained around the head sprocket 228 (and the tail sprocket) of frame section 206. The downstream conveyor 220 also includes a transition section 230 that forms (see FIG. 10) an arcuate path around the head sprocket 228 of frame section 206. The transition section 230 and the side of the upstream conveyor 216 are separated by a gap indicated with reference numeral 232 in FIG. 9.

In the particular embodiment illustrated in the drawings, the upstream and downstream conveyors 216 and 220 are both modified versions of the conveyor chain 10 illustrated in FIGS. 1–8. In particular, the upstream and downstream conveyors 216 and 220 are each constructed of chain modules 12 arranged two-across (or more if a desired). To interconnect the chain modules 12 in each row the pins 46 are replaced with longer chain pins 234 (shown in hidden lines in FIG. 9) that extend the entire width of the chain. In that arrangement the plugs 80 are only used on the outside of the rows.

The conveyor apparatus 200 also includes a transfer mechanism 236 positioned between the upstream and downstream conveyors 216 and 220 to transfer conveyed articles 238 therebetween. In the embodiment illustrated in the drawings the transfer mechanism 236 includes direction changing means such as a set of guide rails 240 and 242. The guide rails 240 and 242 extend over the article supporting surfaces 224 and 226 of the upstream and downstream conveyors 216 and 220 to direct conveyed articles 238 on the upstream conveyor 216 toward the downstream conveyor 220. If the direction of the upstream and downstream conveyors 216 and 220 were reversed, the guide rails 240 and 242 would work to transfer articles from conveyor 220 to conveyor 216.

The transfer mechanism 236 also includes a transfer assist conveyor 244 for transferring conveyed articles 238 across the gap 232 from the upstream conveyor 216 to the downstream conveyor 220. As shown in FIG. 9, the transfer assist conveyor 244 is positioned side-by-side and parallel to the upstream conveyor 216 and travels in the same direction as the upstream conveyor 216. The transfer assist conveyor 244 preferably forms an endless loop trained over the tail sprocket 214 of frame section 204 and over an auxiliary sprocket 246 (shown schematically in FIG. 9) that is supported on frame section 204 as a part thereof. While it is preferred that the upstream conveyor 216 and the transfer assist conveyor 244 share a common drive shaft (i.e., sprocket 214) in other arrangements those conveyors can be driven separately. In those other arrangements the ends of the conveyors 216 and 244, which in the illustrated arrangement are both coincidentally supported at sprocket location 214, need not coincide.

The transfer assist conveyor 244 includes an article supporting surface 250 that is coplanar with the article supporting surfaces 224 and 226 of the upstream and downstream conveyors 216 and 220. The transfer assist conveyor 244 also includes laterally spaced apart end portions 252 and 254. End portion 252 abuts or is closely adjacent the upstream conveyor 216 so that the article supporting surfaces 224 and 250 are substantially continuous, and end portion 254 overhangs the transition section 230 of the downstream conveyor 220. End portion 254 acts as a transfer plate to provide a smooth transition between the article supporting surfaces 250 and 226.

More particularly, in the illustrated arrangement the transfer assist conveyor 244 is constructed as a chain including a plurality of chain links 256 each having a longitudinal centerline 258. Each chain link 256 is preferably of two-piece molded plastic construction and includes a first piece comprising a link module 260 having a longitudinal axis 262. In the illustrated arrangement (see FIGS. 11 and 12) each link module 260 is symmetric in top and bottom views about its axis 262. The link modules 260 are also preferably narrower than, but otherwise similar to, the chain modules 12, and are therefore described below more briefly than the chain modules 12 described above.

Figure 11:
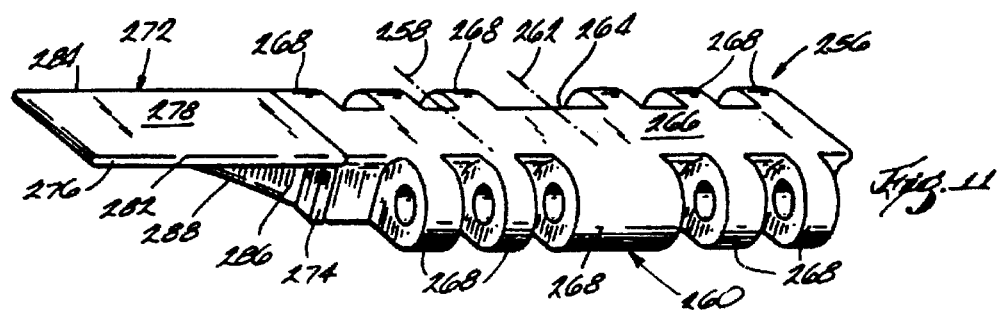
FIG. 11 is an enlarged perspective view of a chain link used in the article transfer mechanism illustrated in FIG. 9.
Figure 12:
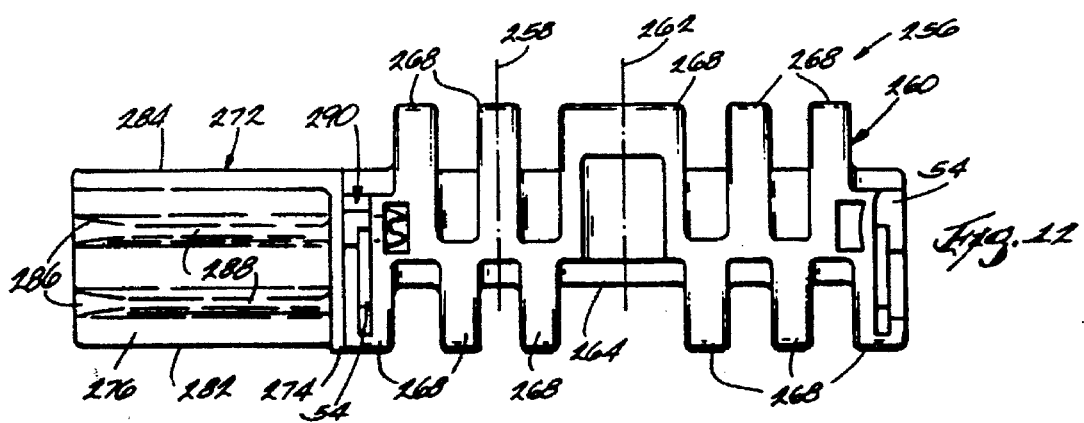
FIG. 12 is a bottom plan view of the chain link illustrated in FIG. 11.

As shown in FIGS. 11 and 12, each link module 260 includes an intermediate section 264 having (FIG. 11) an upper surface 266 that defines a planar section of the article supporting surface 250. Each link module 260 also includes a plurality of link ends 268 that project from the intermediate section 264 and that intermesh (see FIG. 9) with the link ends 268 of following and succeeding link modules 260. The outermost or terminating link ends 268 on the opposite laterally spaced apart sides of each link module 260 are provided with mounting apertures which in the illustrated arrangement are sockets 54.

To serially interconnect the link modules 260, chain pins 270 are passed through the intermeshed link ends 268. Pins 270 are shorter than the width dimension of the chain links 256 (see FIG. 9) and are confined between the outermost link ends 268 so as not to interfere with operation of the transfer assist conveyor 244. To prevent pins 270 from being dislodged from the link modules 260, plugs 80 are inserted into the sockets 54 on one side of the transfer assist conveyor 244 (the left side in FIG. 9). The sockets 54 in the opposite side of the transfer assist conveyor 244 are similarly plugged by means discussed below.

Each of the chain links 256 also includes a second piece comprising an attachment 272 that is securable in cantilevered relation to a link module 260 as further explained below. The attachments 272 give each chain link 256 an asymmetric appearance about both the axis 262 of its link module 260 and its centerline 258 in both top and bottom views (see FIGS. 11 and 12). The attachments 272 also result in pins 270 being offset toward the first end portion 252 of the transfer assist conveyor 244.

As shown in FIGS. 14, 17 and 18, each attachment 272 includes a side plate 274 and a top plate 276 that includes a planar upper surface 278. When the attachments 272 are mounted on the link modules 260, upper surfaces 278 form (FIGS. 9, 10 and 13) a cantilevered lateral extension 280 of article supporting surface 250 which overhangs the transition section 230 and head sprocket 228 of the downstream conveyor 220. Each of the top plates 276 is free of link ends so that the attachments 272 can be manipulated relative to the link modules 260 for reasons that will hereinafter become apparent to one skilled in the art. Instead, each of the top plates 276 is provided with complementary leading and trailing edges 282 and 284 that overlap the corresponding structure in adjacent attachments 272 so that the extension 280 is also free of significant discontinuities.

Each of the attachments 272 also includes a pair of stiffeners or gusset members 286 on the underside of the top plate 276. To minimize the space between the article supporting surfaces 250 and 226, each of the gusset members 286 has (see FIG. 10) an arcuate lower edge 288 that is contoured to follow the arcuate path of the transition section 230. The contoured lower edges 288 permit the attachments 272 to be positioned more closely to the downstream conveyor 220.

Each of the attachments 272 is also provided with means for mounting itself on one of the link modules 260. In the illustrated embodiment the means for mounting the attachment 272 on a link module 260 includes a plug portion 290 that is a modified version of the retaining plug 80. Hence, like reference numerals are used for elements common to the plug portion 290 and the retaining plug 80 and only the differences in structure and operation between those plugs will be explained in detail.

As shown in FIGS. 14–18, the plug portion 290 includes a shaft 294 that extends integrally from the side plate 274 and that supports the primary snap fit arrangement including legs 92. Unlike shaft 82 which includes a screwdriver slot 90 to facilitate pivoting the plug 80 with a screwdriver, shaft 294 (and the rest of the attachment 272) can be manually pivoted by grasping and pivoting the top plate 276. The plug portion 290 also replaces projection 98 with a secondary snap fit arrangement 295 including a pair of projections 296 and 298 that extend from the opposite sides of the arm 96 of the plug portion 290 and a third projection 300 that extends from the side plate 274. The projections 296, 298 and 300 include outer faces 302, 304 and 306 that slant downwardly and outwardly so that the lower parts of the projections 296, 298 and 300 are wider than the upper parts. As shown in FIG. 16, when the arm 96 of the plug portion 290 is in the chain pin blocking position projections 298 and 300 extend into the opposite sides of the outer part 40 of the socket 54 and projection 296 extends into the inner part 42 of the socket 54. The use of multiple projections 296, 298 and 300 and the configuration of those projections makes their removal from the socket 54 more difficult so that the attachment 272 is held more firmly in place than if the plug portion 290 were replaced with the plug 80.

In operation, articles 238 traveling on the upstream conveyor 216 enter the butt turn and contact guide rail 240 which decelerates the articles 238 in the direction of the upstream conveyor and accelerates the articles 238 in the direction of the downstream conveyor 220. As the articles 238 are directed crosswise on the upstream conveyor 216 they move onto the transfer assist conveyor 244 which transfers the articles 238 over the gap 232 and smoothly deposits them on the downstream conveyor 220. Since the transfer assist chain 244 runs with the upstream conveyor 216 the transfer assist chain 244 automatically clears itself at the end of a conveyor run.

Various features of the invention are set forth in the following claims.

We claim:

1. A first conveyor adapted for use with a second transversely oriented article receiving conveyor, said first conveyor comprising a plurality of chain link modules each having a dimension in the direction transverse to the direction of first conveyor movement and an article supporting surface, a plurality of chain pins interconnecting said chain link modules and respectively having lengths substantially equal to said transverse dimension of said chain link modules, and a plurality of replaceable attachments which respectively form cantilevered end portions extending respectively in cantilevered relation from said chain link modules and including respective article supporting surfaces in coplanar relation to said article supporting surface of said chain link modules.

2. A conveyor chain comprising
a plurality of chain links respectively having opposite sides with a width dimension extending therebetween in the direction of conveyor chain movement and each respectively including
a link module portion including
laterally spaced opposite edges, and
an article supporting surface area therebetween, and
a second portion extending laterally with respect to the direction of conveyor chain movement and in cantilevered relation from said link module portion and including
a replaceable attachment securable to one of said link module portion edges, and
a plurality of elongated chain pins
having opposite ends, and
a length between said opposite ends less than said width dimension, being offset laterally so that said second portions are cantilevered in offset relation to one of said chain pin ends, and serially interconnecting said link module portions such that said article supporting surface areas form a continuous article supporting surface.

3. A conveyor chain as set forth in claim 2 wherein said replaceable attachment includes
a planar surface coplanar with said article supporting surface section, and
wherein said replaceable attachment is constructed and arranged so that said planar surface thereof is adapted to extend over a portion of a second conveyor oriented transversely to said conveyor chain to transfer articles therebetween.

4. A conveyor apparatus comprising
a first conveyor including
an article supporting surface defining a plane, and
a transition section deviating from said plane, and
a second conveyor oriented transversely to said first conveyor and including
a plurality of elongated chain pins, and
a plurality of chain links interconnected by said chain pins and respectively including
link module portions respectively including
opposite laterally spaced apart sides confining entirely therebetween said chain pins, and an article supporting surface generally coplanar with said article supporting surface of said first conveyor, and a cantilevered portion extending laterally from said link module portion and from said chain pins to provide an extension of said second conveyor article supporting surface overhanging said transition section of said first conveyor and including a replaceable attachment securable to one of said laterally spaced apart sides of said link module portions.

5. A conveyor apparatus comprising a frame, a sprocket supported by said frame, a first conveyor supported by said frame and including an article supporting surface defining a plane, and a transition section supported by said sprocket along an arcuate path deviating from said plane, and a second conveyor supported by said frame, oriented transversely to said first conveyor, and including a plurality of elongated chain pins, and a plurality of chain links interconnected by said chain pins and respectively including a link module portion including an article supporting surface generally coplanar with said article supporting surface of said first conveyor, and a cantilevered portion extending laterally from said link module portion and away from from said chain pins and into overhanging relation to said transition section of the first conveyor to provide an extension of said second conveyor article supporting surface, and including a lower edge portion contoured to follow the arcuate path of said transition section.

6. A conveyor apparatus comprising
a frame,
a first conveyor supported on said frame and including an article supporting surface,
a second conveyor oriented transversely to said first conveyor, supported on said frame, and including an article supporting surface, and
a transfer assist conveyor chain supported on said frame in side-by-side parallel relation with one of said first and second conveyors, extending transversely with respect to the other of said first and said second conveyors, and including
an article supporting surface located in coplanar relation to said article supporting surfaces of said first and second conveyors, and including
a plurality of interconnected chain links respectively including
a link module portion including
opposite laterally spaced apart sides, one of said laterally spaced apart sides extending alongside said one of said first and second conveyors and the other of said laterally spaced apart sides including
a mounting aperture, and
a cantilevered portion extending laterally from said link module portion, forming an extension of said article supporting surface of said transfer assist conveyor chain, overhanging said other of the first and second conveyors, and comprising
a replaceable attachment securable in said mounting aperture of one of said link module portions.

7. A conveyor apparatus comprising a frame including a sprocket, a first conveyor supported on said frame and including an article supporting surface, a second conveyor oriented transversely to said first conveyor, supported on said frame, and including an article supporting surface, and a transition section supported in an arcuate path on said sprocket, a transfer assist conveyor chain supported on said frame in side-by-side parallel relation with one of said first and second conveyors, extending transversely with respect to the other of said first and second conveyors, and including an article supporting surface located in coplanar relation to said article supporting surfaces of said first and second conveyors, and including a plurality of interconnected chain links of two-piece molded construction, and respectively including a link module portion including a plurality of link ends intermeshed with said link ends of another one of said link module portions, opposite laterally spaced apart sides, one of said laterally spaced apart sides extending alongside said one of the first and second conveyors and the other of said laterally spaced apart sides including a mounting aperture, and a cantilevered portion extending laterally from said link module portion, forming an extension of said article supporting surface of said transfer assist conveyor chain, projecting over said sprocket, overhanging said other of the first and second conveyors, and comprising a replaceable attachment securable in said mounting aperture of one of said link module portions and including a lower edge portion contoured to follow the arcuate path of said transition section.

8. A conveyor chain adapted for use with a transversely oriented conveyor, said conveyor chain comprising a plurality of intermeshing chain link modules forming an article supporting surface and including opposite end portions spaced apart laterally with respect to the direction of movement of the conveyor chain, a plurality of chain pins interconnecting said chain link modules, and a plurality of attachments respectively mountable in cantilevered relation on one of said chain link modules and including a plug portion securable to said one of said chain link modules in snap-fit relation, and a top plate including an upper surface extending from said plug portion and forming an extension of said article supporting surface formed by said chain link modules.

9. A conveyor chain adapted for use with a second conveyor oriented transversely thereto, said conveyor chain comprising a plurality of chain link modules forming article supporting surfaces and respectively including a socket, a plurality of chain pins interconnecting said chain link modules, and a plurality of replaceable attachments mountable in cantilevered relation on said chain link modules and being constructed and arranged to extend over a portion of a second conveyor oriented transversely to said conveyor chain to transfer articles therebetween, each of said replaceable attachments including a plug portion securable in snap-fit relation in said socket of one of said chain link modules, and a top plate including an upper surface extending from said plug portion and forming an extension of said article supporting surface formed by said chain link modules.

10. An article transfer attachment for use with a chain link module having opposite sides and a socket formed in one of the opposite sides, said attachment comprising
a plug portion receivable in said socket to releasably secure said attachment to said chain link module and including
an arm having
opposite end portions,
a primary snap-fit arrangement on one of said end portions of said arm, and
a secondary snap-fit arrangement on the other of said end portions of said arm, and
a top plate extending from and parallel to said plug portion and being constructed and arranged to extend in cantilevered relation with respect to said chain link module.

11. An article transfer attachment as set forth in claim 10 wherein said primary snap-fit arrangement acts as a pivot point for pivoting said attachment relative to said chain link module, and wherein said second snap-fit attachment is moveable between a first position and a second position in which said second snap-fit attachment is adapted to obstruct chain pin movement used to connect one of said chain link modules to another one of said chain link modules.

12. A conveyor chain comprising a plurality of chain links each including a link module portion including an axis extending in the direction of conveyor chain movement, opposed sides having therebetween a width dimension extending transversely to said axis, a planar article supporting surface area extending coextensively with said width dimension and in symmetric relation to said axis, and a second portion extending in generally coplanar relation to said article supporting surface of said link module and laterally with respect to said axis and in cantilevered relation from only one of said sides of said link module portion, whereby each of said chain links is asymmetrical in top view with respect to said axis, and a plurality of elongated chain pins having respective axes extending in fixed parallel relation to said planar article supporting surface areas, having respective axially spaced ends, having respective lengths between said ends which are substantially equal to the width of said module portion width dimensions, and serially interconnecting said link module portions such that all of said second portions are axially aligned in the direction of conveyor chain movement and are laterally offset from the same one of said opposed ends of said chain pins, whereby all of said second portions are cantilevered from the same one of said opposed ends of said chain pins.

13. A conveyor chain as set forth in claim 12 wherein the link module portion of each of the chain links includes
opposite laterally spaced apart sides, and wherein each of said chain pins is confined between the spaced apart sides of said link module portion of one of said chain links.

14. A conveyor chain as set forth in claim 13 wherein each of said link module portions includes
a link ends spaced in the direction of intended chain travel, wherein said link ends of each of said link module portions intermesh with said link ends of another of said link module portions, and wherein said second portion of each of said chain links is free of the link ends.

15. A conveyor chain as set forth in claim 13 wherein said second portion of each of said chain links includes
a top plate forming
a lateral extension of said article supporting surface.

16. A conveyor chain adapted for use with a transversely oriented conveyor having a planar article supporting surface, said conveyor chain comprising a plurality of chain link modules extending transversely with respect to the direction of movement of the conveyor chain and each including an article supporting surface located in coplanar relation to the article supporting surface of the transversely oriented conveyor and having a first side edge and a second side edge spaced apart laterally from said first side edge with respect to the direction of movement of the conveyor chain and being arranged to extend in cantilevered relation over a portion of the transversely oriented conveyor to facilitate direct transfer of articles therebetween, and a plurality of chain pins interconnecting said chain link modules in intermeshing relationship and respectively extending from said first side edges to locations in spaced relation to and clear of said second side edges.

17. A conveyor chain as set forth in claim 16
wherein said article supporting surface formed by said chain link modules defines a plane, and wherein said one of said end portions forms an extension of said article supporting surface formed by said chain link modules and is coplanar therewith.

18. A conveyor chain as set forth in claim 16
wherein each of said chain pins is offset laterally with respect to the direction of movement of said conveyor chain and toward the other of said end portions so that said one of said end portions is cantilevered with respect to said chain pins.

19. A conveyor chain as set forth in claim 16
wherein each of said chain link modules includes opposite laterally spaced apart sides, and wherein said one of said end portions extends laterally from one of said laterally spaced apart sides of at least some of said chain link modules.

20. A conveyor chain as set forth in claim 16
wherein said conveyor chain includes
a plurality of attachments mountable in cantilevered relation on one of said chain link modules to form said one of said end portions.

21. A first conveyor adapted for use with a transversely oriented conveyor having a planar article supporting surface, said first conveyor comprising a plurality of chain pins having substantially the same lengths, and a plurality of chain links interconnected by said chain pins and each including a link module portion including an article supporting surface located in generally coplanar relation to the article supporting surface of the transversely oriented conveyor, having opposed sides extending in the direction of first conveyor movement, and a dimension extending between said opposed sides and in the direction transverse to the direction of first conveyor movement, and a cantilevered side portion extending laterally in alignment with respect to the direction of first conveyor movement and in cantilevered relation from only one of said opposed sides of said link module portions and laterally beyond said chain pins, and being constructed and arranged to extend over a portion of the transversely oriented conveyor and into closely spaced relation to an article supporting surface thereof to facilitate direct transfer of articles therebetween.

22. An article transfer attachment for use with a chain link module having opposite sides and a socket formed in one of the opposite sides, said attachment comprising
a plug portion receivable in said socket to releasably secure said attachment to said chain link module, and a top plate extending from and parallel to said plug portion and being constructed and arranged to extend in cantilevered relation with respect to said chain link module.

\* \* \* \* \*

Disclaimer 5,634,550—Peter J. Ensch, Wauwatosa; Paul J. Marks, Milwaukee; Thomas Motaine, Thiensville; Timothy J. Schladweiler, West Bend, all of Wis. DIRECTION CHANGING MECHANISM FOR TRANSFERRING ARTICLES BETWEEN TRANSVERSE CONVEYORS. Patent dated June 3, 1997. Disclaimer filed August 11, 1997, by the assignee, Rexnord Corporation.

Hereby enters this disclaimer to claim 21 of said patent.

*(Official Gazette,* November 4, 1997)